United States Patent [19]

Pistorius et al.

[11] Patent Number: 5,327,653
[45] Date of Patent: Jul. 12, 1994

[54] MITER LINEAR MEASUREMENT GAGE

[76] Inventors: Robert T. Pistorius, 19 Peak St., Lake Ronkonkoma, N.Y. 11779; Thomas H. Hoffmann, Augartenstrasse 16, 7520 Bruchsal, Fed. Rep. of Germany

[21] Appl. No.: 932,302

[22] Filed: Aug. 19, 1992

[51] Int. Cl.$^5$ ............................ G01B 7/02; B26D 7/28
[52] U.S. Cl. ...................................... 33/1 M; 33/708; 33/526; 83/522.25
[58] Field of Search ............... 33/706, 707, 708, 784, 33/526, 464, 466, 1 M; 83/522.18, 522.19, 522.21, 522.25

[56] References Cited

U.S. PATENT DOCUMENTS

| 4,600,184 | 7/1986 | Ashworth | 269/307 X |
| 4,625,410 | 12/1986 | Eder | 33/1 M |
| 4,713,887 | 12/1987 | Kitamura | 33/1 M |
| 4,961,269 | 10/1990 | Luttmer et al. | 33/706 |
| 5,007,177 | 4/1991 | Rieder et al. | 33/706 |
| 5,063,983 | 11/1991 | Barry | 269/307 X |

Primary Examiner—William A. Cuchlinski, Jr.
Assistant Examiner—Alvin Wirthlin
Attorney, Agent, or Firm—Galgano & Burke

[57] ABSTRACT

A magnetic-electronic linear measurement gage for measuring workpiece miter lengths for picture and window frames and the like includes a gage bed on which a workpiece may be removably mounted, a stop body slidably mounted on the gage bed having a stop which may butt against a workpiece mitered end, and length and width scales and scanning units associated with the gage and the stop body generating output signals in response to the scanning of the scales. The output signals are received and converted by a CPU to generate a linear measure output signal which may be inputted to a digital LED display for visually displaying the linear measure corresponding to the workpiece length so measured.

10 Claims, 4 Drawing Sheets

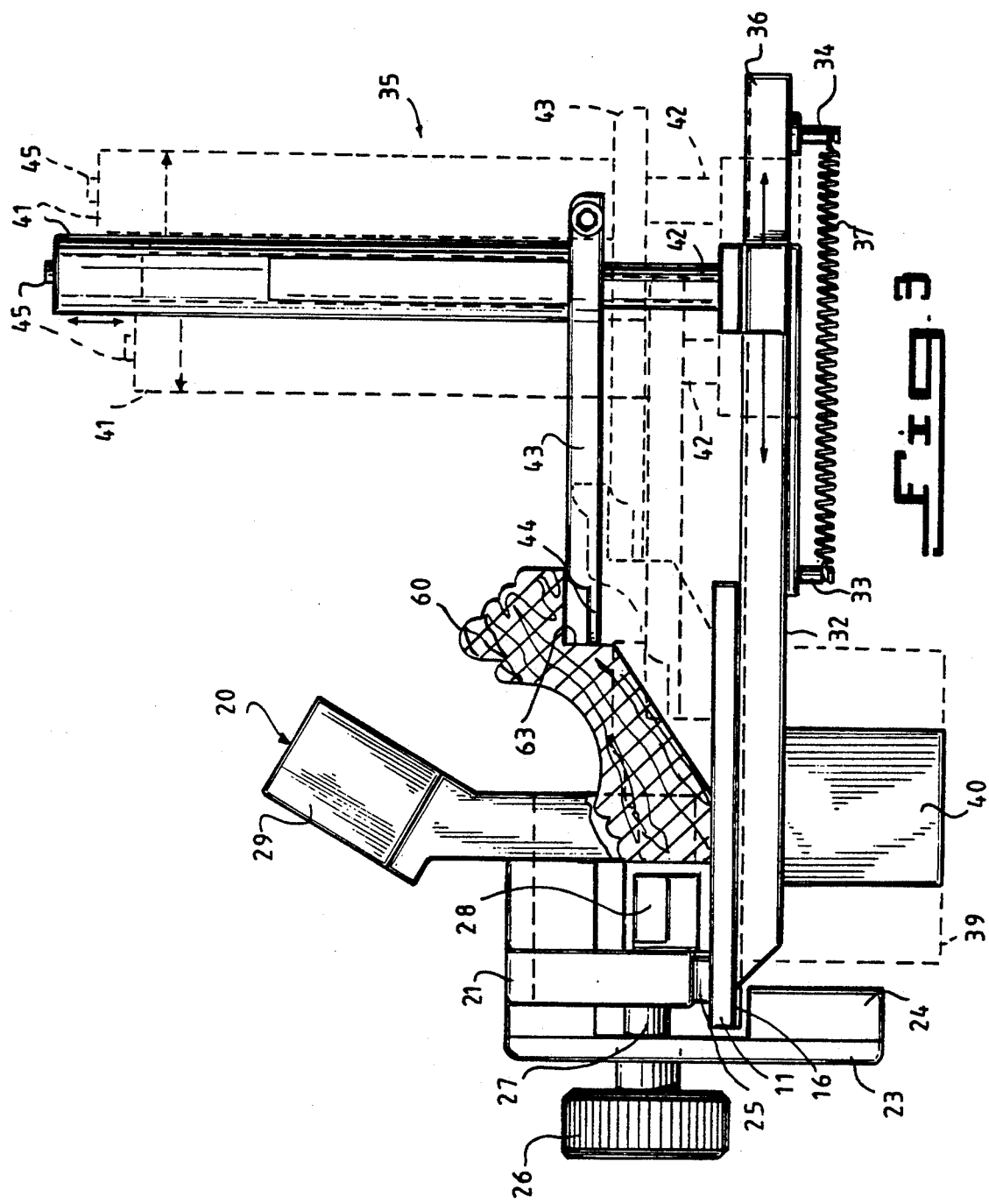

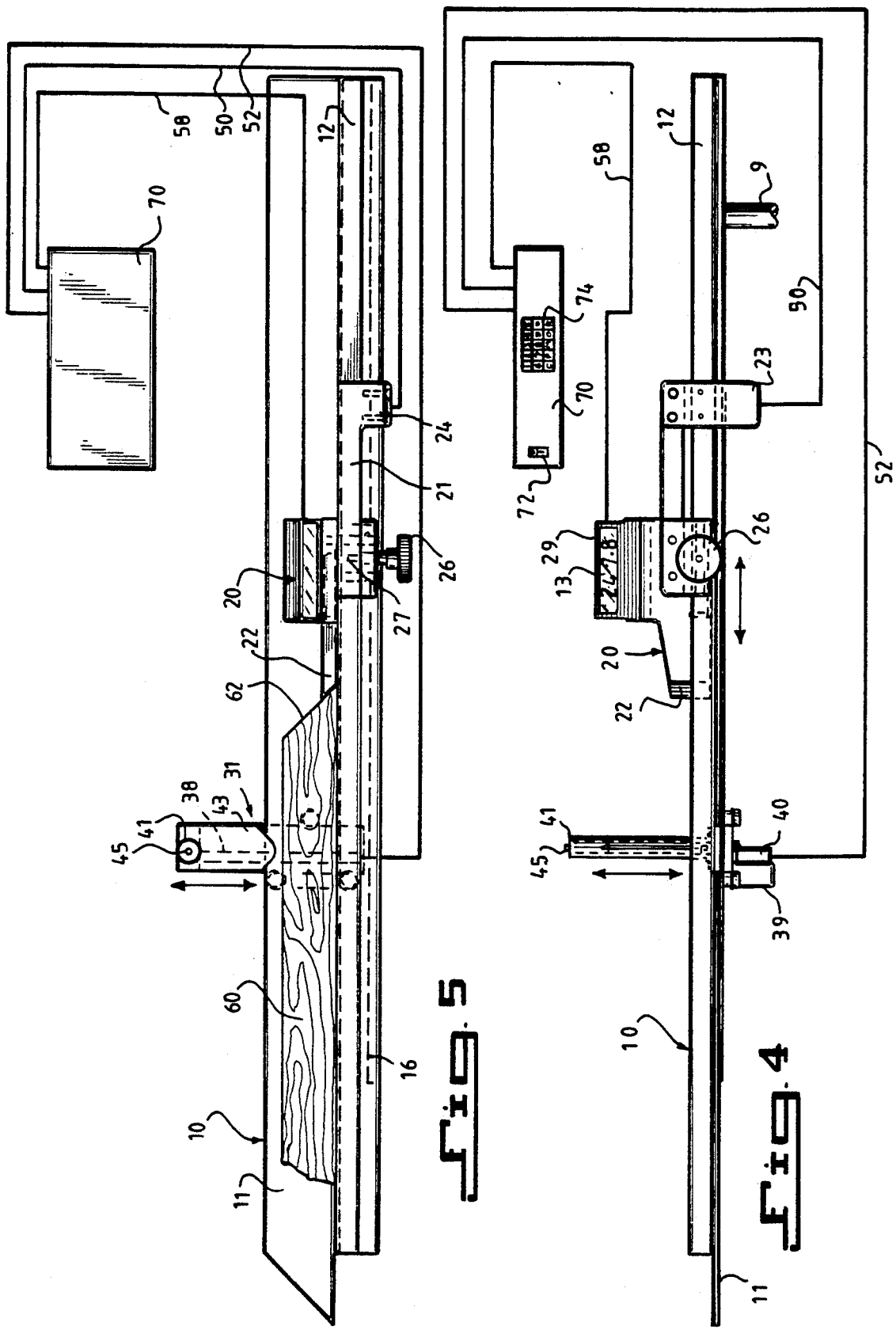

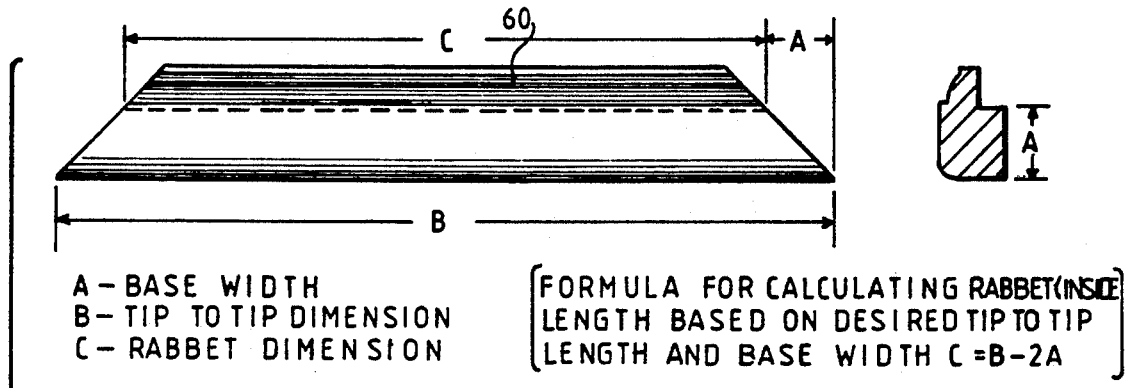
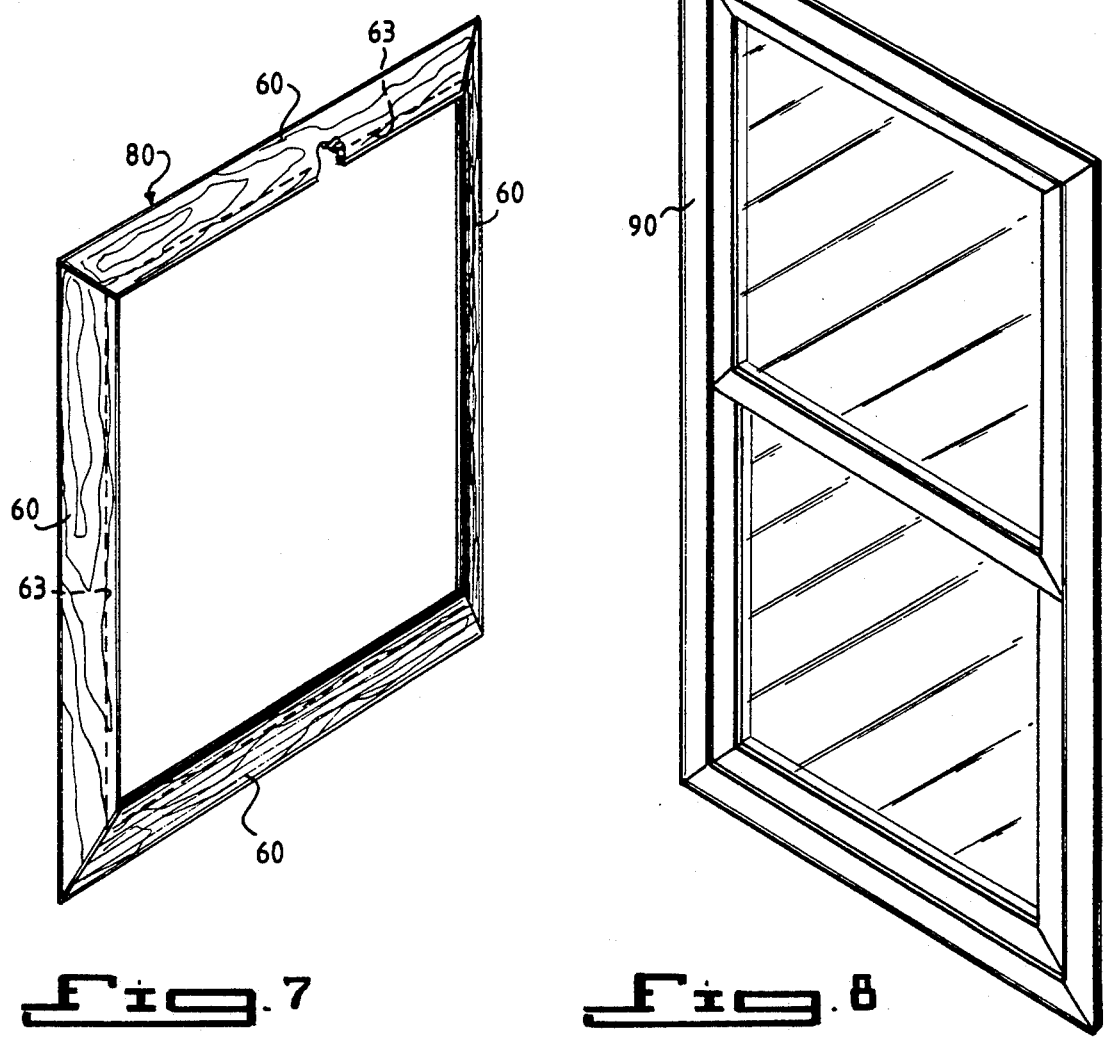

MITER LINEAR MEASUREMENT GAGE

BACKGROUND OF THE INVENTION

The present invention relates to an improved gage for measuring the length of mitered articles, especially inside and outside lengths of 45 degree miters. More particularly, it relates to such a gage for measuring and sizing mitered lengths for picture frames, windows and the like.

In the manufacture of picture frames, it is generally necessary to join together mitered lengths of frame stock, typically made of wood, metal or plastic or a composite thereof. Standard frames are square or rectangular and require four mitered lengths which form the four sides of the frame. These frame lengths must be accurately mitered to ensure proper sizing and fit of the subsequently joined lengths. The frame side lengths are typically cut with a double bladed miter saw. Mechanical gages have been employed to measure the lengths prior to cutting.

One commercial example of a mechanical gage is the VISI-MITER gage sold by Pistorius Machine Co., Inc., of Hauppauge, New York, covered by U.S. Design Pat. No. 224,717. The gage allows one to easily and without computations measure either inside, rabbet or outside "tip-to-tip" dimensions to suit the size of the item being framed. The gage includes a stainless steel gage strip having a scale comprised of etched and color-coded visual sighting lines which are parallel to the saw blade on the right hand side of the double miter saw. When material to be measured is placed on the stainless scale, the mitered face of the material is at right angles to the visual sighting lines. If the rabbet dimension is desired, the operator places the rabbet corner of the molding directly on the sighting line for the dimension desired. A stop is then placed against the miter and tightened with a handle. The operator can then repetitively cut accurate lengths of stock simply by placing the stock against the stop. For each change of size required, the above process must be repeated.

While quite satisfactory in use, the accuracy of the gage is limited by the visual accuracy of the operator, which can vary from piece to piece or operator to operator.

SUMMARY OF THE INVENTION

Accordingly, it is an object of the present invention to provide a novel linear measurement gage which specifically intended for picture and window frames and the like which eliminates inaccurate measurements caused by visual sighting errors.

It is a further object of the present invention to provide an electronic digital linear measurement gage for outside, inside and rabbet measurements which will allow virtually any operator to make error free stop settings, improve quality control, and virtually eliminate incorrectly cut parts.

It is yet a further object of the present invention to provide such an electromechanical gage which is readily adaptable to fit a wide variety of commercial saw machinery and, in particular, double miter saws which quickly affords digital readouts in fractions, either English decimals, or Metric (millimeters) measurements with a high degree of accuracy and resolution.

It is a more particular object of the present invention to provide a novel magnetic-electronic linear measurement gage which is relatively simple in design, economical to fabricate and easy to use.

Certain of the foregoing and related objects are readily attained in a linear measurement gage for measuring workpiece miter lengths for picture and window frames and the like comprising an elongated gage bed having an upright fence on which a workpiece may be removably mounted abutting the fence and stop means slidably mounted on the gage bed having a stop which may butt against a workpiece mitered end and whose position may be fixed to fix the position of the workpiece. A length scale and scanning means is also provided having a first incremental linear scale and a first length non-contacting scanning unit for scanning said incremental linear scale, with one of the scale means and the scanning unit being mounted on the bed and the other being mounted on the stop means, the scanning unit generating first output signals in response to the scanning of the scale. The device further includes width scale and scanning means having a second incremental linear scale and a second length non-contacting scanning unit for scanning the incremental linear scale, with one of the scale means and the scanning unit being mounted on the stop means in a direction transverse to the bed and the other being movably mounted relative thereto, the second scanning unit generating second output signals in response to the scanning of the second scale. Display means are provided for displaying the measured length of the workpiece. The device additionally includes computer control means for receiving the first and second output signals, deriving from the output signals, digital countable signals and a direction signal indicating the direction of the scanning movement, counting and converting the countable and directional signals to a linear measure output signal which may be inputted to the display means for visually displaying the linear measure corresponding to the workpiece length so measured.

Preferably, the stop means has a transverse leg coupled thereto disposed transversely to the gage bed which has an extensible and retractable arm slidably secured thereto. In a particularly preferred embodiment of the invention, the first and second incremental linear scales are linear magnetic pulsing scales having successive, reversely-polarized, spaced-apart scale elements, with the first scale being mounted on the gage bed, and the second scale being mounted on the transverse leg of the stop means. Most advantageously, the first and second scanning units each comprise a pair of hall effect magnetic sensors, the pair of the first scanning unit being mounted on the stop means for travel therewith along the gage bed and the pair of the second scanning unit being mounted on the extensible and retractable arm of the stop means transverse leg. Most desirably, the width scale and scanning means includes a reference switch for generating a reference signal relative to the position or width being measured.

The display means preferably comprises a digital LED display. In addition, the stop means is desirably slidably mounted on the gage bed fence and has a rotatable control knob which is engagable with the fence to fix the position of the stop means. The gage bed fence advantageously has a C-shaped cross-section.

In a particularly preferred embodiment of the invention, the retractable arm has an upstanding shaft mounted thereon which, in turn, telescopically supports an upstanding and vertical displaceable handle grip. The handle grip has an inwardly-directed, horizontally-extending tongue secured thereto and a push button electrical switch mounted thereon which serves as said reference switch.

BRIEF DESCRIPTION OF THE DRAWINGS

Other objects and features of the present invention will become apparent from the following detailed description considered in connection with the accompanying drawings which discloses one embodiment of the present invention. It should be understood, however, that the drawings are designed for the purpose of illustration only and not as a definition of the limits of the invention.

In the drawings, wherein similar reference characters denote similar elements throughout the several views:

FIG. 3 is a side sectional view of the inventive gage showing a molding length being measured by the gage and showing the vertical and horizontal adjustment of the rabbet width measuring arm, in phantom line.

FIG. 4 is a front elevational view of the inventive gage;

FIG. 5 is a bottom view of the inventive gage; and

FIG. 6 is a plan and sectional view of a molding length showing the standard length dimensions to be measured by the gage;

FIG. 7 is an isometric view of a conventional picture frame; and

FIG. 8 is an isometric view of a typical double hung window and frame.

DETAILED DESCRIPTION OF THE PREFERRED EMBODIMENTS

Figure 1:
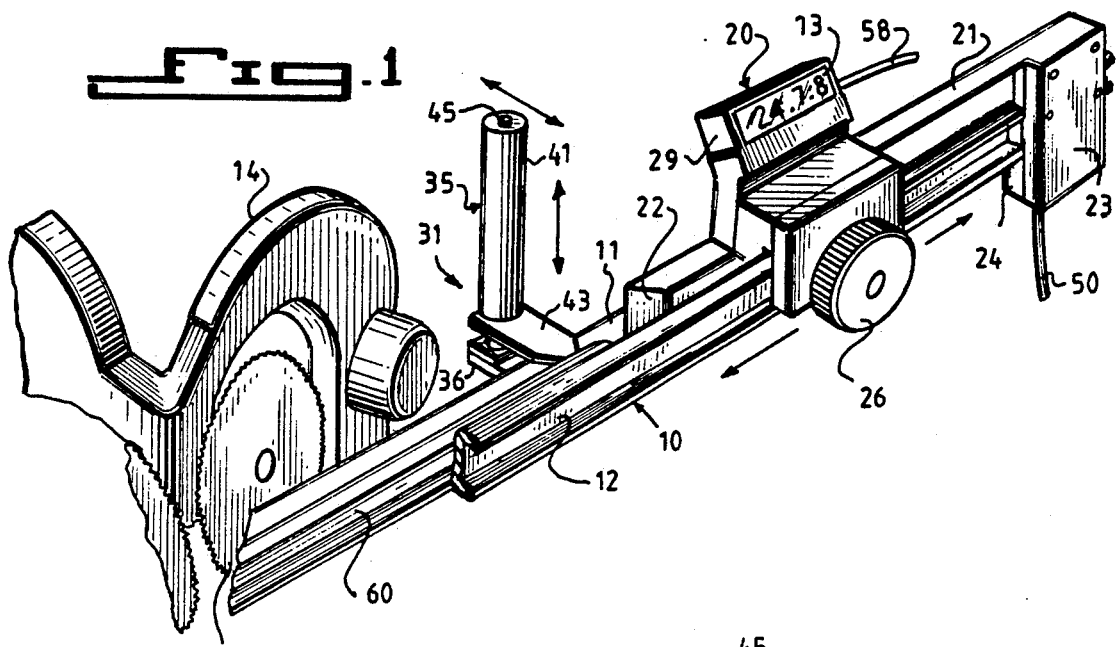
FIG. 1 is a front and top isometric view of the linear measurement gage embodying the present invention disposed adjacent a conventional double miter saw.
Figure 2:
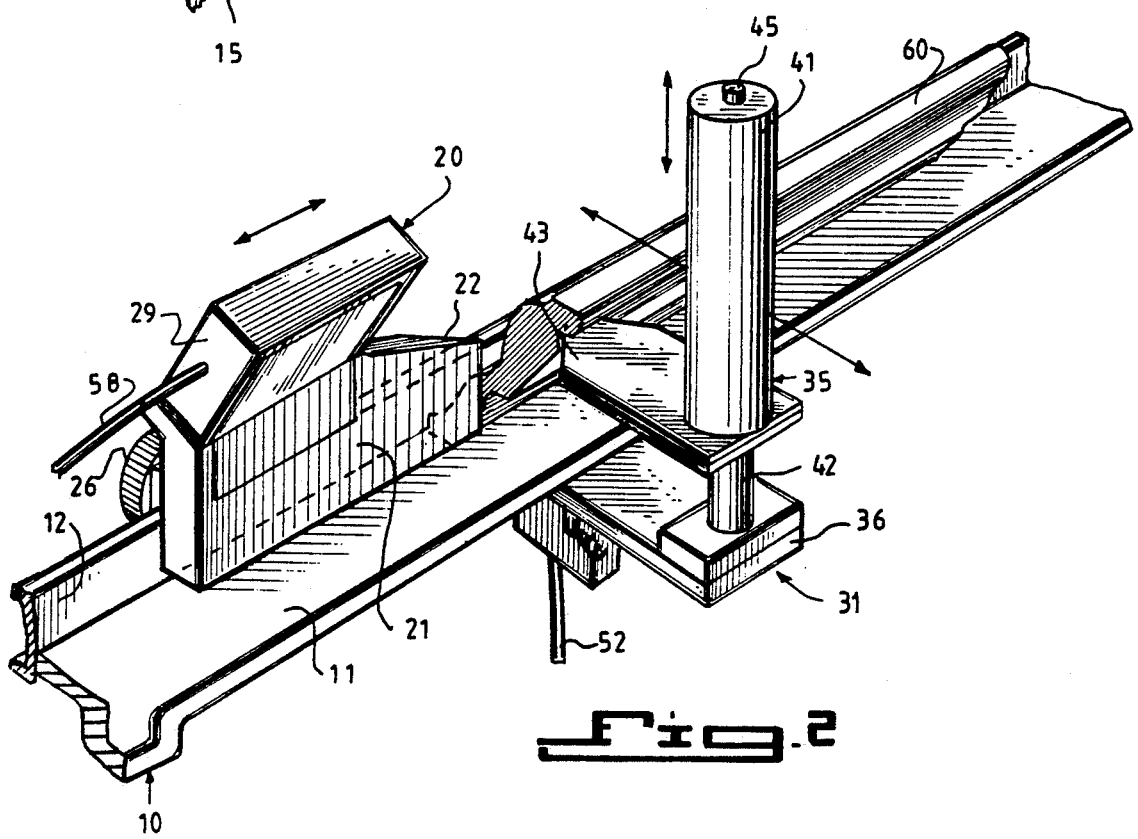
FIG. 2 is a rear and top isometric view of the linear measurement gage embodying the present invention.

Turning now in detail to the drawings, and in particular, FIGS. 1 and 2 thereof, their illustration is a novel linear measurement gage embodying the present invention which includes an elongated rail or gage bed preferably made of nickel plated steel, generally designated 10, having a horizontal leg 11 for supporting mitered lengths of workpiece stock 60 and a vertical leg or fence 12 having a C-shaped cross-section which slidably supports a linear scale reader and display assembly, generally designated 20. Support rail 10 is suitably supported by support legs 9 (see FIG. 4) adjacent to a conventional double miter saw generally designated 14, having two cooperating saw blades 15 oriented to provide a double miter cut in stock 60.

As seen best in FIGS. 3 and 5, a linear magnetic pulsing scale 16 (represented in part by phantom line in FIG. 5) is placed on the underside of bed 11 of rail 10 and extends most of its entire length. Magnetic scale 16 preferably has a multiple-ply sandwich construction composed of an inner ply (0.3 mm) of a magnetized flexible steel strip, a middle ply of ferrite-bonded or impregnated flexible plastic strip (1.2 mm) and an outer ply (0.3 mm) of stainless steel strip, which serves as a protective shield. The ferrite-bonded flexible plastic has a multiplicity of spaced-apart magnetic scale elements or reference bars, with adjacent bars having a reverse polar orientation, preferably spaced apart 5 mm (200 poles/m), with the bars being transversely oriented relative to rail 10. The purpose and operation of the magnetic scale 16 will be discussed in greater detail hereinafter.

As shown in FIGS. 1-3, the scale reader and display assembly 20 includes a movable support and stop body 21, having an extended stop tongue 22 at the end thereof proximate to saw 14 and at its opposite end, a depending support body 23, the lower end of which supports an inwardly directed sensor head of a pair of conventional hall effect magnetic readers or sensors 24 disposed immediately beneath magnetic scale 16; the purpose of the readers will be discussed in greater detail hereinafter. Stop body 21 slidably rests on a low friction slide 25 (see FIG. 3) to allow body 21 to slide and reciprocate freely in both directions along C-shaped fence 12. Stop body 21 has a threadably supported, conventional rotatable control knob 26 which can be used to lock stop body 21 via its shaft 27 which presses a stop block 28 against gage fence 12 at a desired position. Immediately behind and above control knob 26 is a display housing 29 supported on stop body 21 which houses an LED digital read out display 13 for displaying the length measured.

A material or stock width magnetic sensor and reader assembly 31 is also attached to stop body 21 on the rear side of gage bed 11 such that it is positioned outwardly of stop tongue 22 so that it will face the stock 60 along its normal width, i.e., spaced from its mitered end 62 (see FIG. 5). As seen best in FIG. 3, the assembly 31 includes a horizontal support or leg 32 affixed to stop body 21 which protrudes transversely beneath gage bed 11 and which slidably supports a stock width measuring arm, generally designated 35, which has a retractable horizontal leg 36 which is spring loaded via spring 37 held at one end by a pin 33 to leg 32 and at its other end by a pin 34 to leg 36 and slidably supported via support 32. A linear magnetic pulsing scale 38 (See FIG. 5), similar to scale 16, is affixed to the underside of leg 36 and extends substantially its entire length. Stop body 21 has a depending support body 39 which supports a material width sensor head of a pair of conventional hall effect magnetic sensors or readers 40 immediately beneath scale 38.

An upright, cylindrical grip handle 41 having a soft rubber grip is mounted on the end of leg 36 such that it is vertically displaceable. Handle 41 is telescopically received in a slight friction-fit manner on lower inner shaft 42 to allow for vertically displaceable movement of handle 41. An inwardly and horizontally-extending width sensor tongue 43 is affixed to the lower end of handle 41, the tip 44 of which serves to engage the stock 60 at a rabbet joint 63. As shown in phantom view in FIG. 3, grip handle 41 can adjust vertically and horizontally (see arrows) to accommodate different sizes, widths and rabbets of stock 60. The grip handle also has a data entry push button electrical switch 45, the purpose of which will be described in greater detail hereinafter.

As shown in FIGS. 4 and 5, the electrical outputs from the length magnetic readers are coupled via wire leads 50 to an input of a conventional microprocessor-based control unit 70 comprising a central processing unit or CPU which has an on/off switch 72 and a data entry keypad 74. Similarly, the magnetic width sensors and push button switch 45 are also coupled to microprocessor-based control unit 70 via wire leads 52. The output of control unit 70 is coupled via wire lead 58 to the LED display 13.

FIG. 6 illustrates the standard dimensions of the workpiece stock to be measured and the formula used by the CPU of the control unit 70 for determining rabbet length based on the desired tip-to-tip length and base width for a 45° miter cut-namely, $C=B-2A$ where A is the base width, B is the tip-to-tip dimension and C is the rabbet or inside dimensions. The control unit CPU has a computer logic chip which is equipped with a program which mathematically calculates the difference between outside and inside length via the above formula. Tip-to-tip length B can be determined by transposing the equation to solve for B-namely, $B=C+2A$. These calculations are suitable for making miter cuts for picture frames 80 (FIG. 7) and window frames 90. However, it can, of course, be used for other miter angles so as to make other frame configurations such as pentagons, octagons, etc. In such a case, the formula would be $C=B-2A/TAN\alpha$ where $\alpha$ is the desired miter angle.

The present electronic rabbet measurement gage displays both tip-to-tip size measurements and rabbet size measurements for the gaging of various materials. Tip-to-tip gaging is done by electronically computing the distance of the gage stop from a known reference point; this reference point is set by the push of button 45. The rabbet size gaging is done by electronically computing the width of the material at which the gaging will be done for a piece of material and then electronically computing what the rabbet size would be based upon the material width, the tip-to-tip size, and the angle of cut.

The material width and tip-to-tip sizing is determined through the use of the two separate linear measuring devices. As previously noted, both the length and width linear measuring devices are made up of two conventional hall effect magnetic sensors mounted in a sensor head that moves in a non-contacting fashion over the magnetic scales 16 and 38 composed of discrete magnetized segments or stripes with alternating "North" and "South" poles. As one of the hall effect sensors passes over one of the magnetically polarized sections of the ferrite strip, a varying voltage output signal is given. From the varying output voltage, the position of the sensor head can be determined relative to one of the polarized sections. The varying voltage "steps" or pulses can then be relayed via lines 50 and 52 counted via the CPU of the control unit as the heads pass over one alternating polarized field to the next on the ferrite strip. The number of "steps" can then be directly converted into a distance based upon the known spacing of the magnetic stripes or voltage "steps", e.g., with 5 mm spacings between magnetic stripes, for every 0.1 mm of movement the CPU will count one digital pulse By using the second hall effect sensor offset from the first, direction of movement can be determined by the relative changing voltages of each sensor. The CPU will then send a signal to the LED display to digitally display the length defined by the pulses counted. The actual operation and set up of the control unit and sensors and its elements, i.e., magnetic hall effect sensors, CPU will be well understood by those skilled in the art as they concern standard conventional electronic components. See, for example, U.S. Pat. Nos. 4,459,749, 4,631,403, 4,867,568, 4,982,507, 4,996,778, 5,007,177, 5,010,655, 5,021,650, 5,079,850, 5,099,583, 5,115,573 and 5,117,376, the subject matter of which is incorporated herein by reference thereto.

Turning now to the operation of the gage, the operator initially lays the material or stock 60 to be cut onto the bed 11 of the gage 10 against the fence 12. If a rabbet dimension is desired, the tip 44 of rabbet tongue 43 is slid in toward the fence 12 until it contacts the molding 60 in the appropriate rabbet 63 (see FIG. 3). After contact is made, the input button 45 on the top of the handle 41 is pressed, which inputs the position data to the CPU of the control device via the magnetic scale 38 and sensor heads and the rabbet length is instantly displayed on the digital display 13. If tip-to-tip size is desired, the operator slides the "rabbet" sensor tongue 43 to the gage fence 12 and presses the input button 45. The digital display will then show the tip-to-tip length. Using the keypad 74, the operator can select a display mode in decimals, millimeters or fractions. In the fractional mode, delineations can be selected fin 64ths, 16ths, 8ths, etc.

After the width of the molding has been entered, the operator slides the stop body 21 left or right along the gage fence until the LED digital display 13 shows the size desired. The control knob 26 on the stop body 21 is then tightened to maintain the selected size in repetitive cuts. A battery backup is provided in the control unit 70 for the CPU. As a result, when the unit is turned on, the display will show the current position. The stop position therefore does not need to be recalibrated when powered off. The display is provided to allow accurate digital size positioning. The CPU keypad 74 also allows initial calibration of the stop body 21 in relation to the saw blade, to compensate for different saw blade kerf thicknesses, to compensate for glass allowance and to select display mode (fractions, decimals or millimeters).

As can be seen from the foregoing, the present invention affords a linear gage adaptable to both English and Metric scales. It is therefore ideal for use anywhere in the world since display modes can be changed instantly. It can be easily used by unskilled labor with virtually no training. It provides repetitive accuracy impossible to achieve with a mechanical gage. It can be set up for either left or right hand use, and can be used for different angles. It virtually eliminates operator error and is readily adaptable to most machines.

It will be apparent that various modifications may be made as will be apparent to those skilled in the art. For example, although the electronic gage is designed for use on double miter saws, however its use can be extended to single blade saws and the like. Moreover, while the gage is designed primarily for 45 degree angles, it can also be extended to other angles such as 22-½ degrees (octagon), 30 degrees (hexagon), etc.

In addition, although a magnetic sensing device is preferred, other contactless sensing devices and increment encoders (i.e., position verification devices that indicate linear motion and direction of movement), preferably quadrative encoders to allow determination of direction, could be employed such as optical encoders and scanning units.

Accordingly, while only one embodiment of the present invention have been shown and described, it is to be understood that many changes and modifications may be made thereunto without departing from the spirit and scope of the invention as disclosed herein.

What is claimed is:

1. A linear measurement gage for measuring workpiece miter lengths and inside dimensions for picture and window frames and the like, comprising:
   an elongated gage bed having an upright fence on which a workpiece may be removably mounted abutting said fence;
   stop means slidably mounted on said gage bed having a stop which may butt against a workpiece mitered end and whose position may be fixed to fix the position of said workpiece, said stop means having a transverse leg coupled thereto disposed transversely to said gage bed which has an extensible and retractable arm slidably secured thereto;

length scale and scanning means having an incremental linear length scale and a length non-contacting scanning unit for scanning said incremental linear length scale, one of said length scale means and said lengthscanning unit being mounted on said bed and the other being mounted on said stop means, said scanning unit generating length output signals in response to the scanning of said scale;

width scale and scanning means having an incremental linear width scale and a width non-contacting scanning unit for scanning said incremental linear width scale, one of said width scale means and said width scanning unit being mounted on said stop means in a direction transverse to said bed and the other being movably mounted relative thereto, said width scanning unit generating width output signals in response to the scanning of said width scale, said width scale and scanning means including a reference switch for generating a reference signal relative to the position or width being measured;

computer control means for receiving the length and width output signals, and for converting said output signals to a linear measure output signal corresponding to the inside dimension of the workpiece being measured; and display means for displaying said measured inside dimension of the workpiece coupled to said computer control means.

2. The linear measurement gage according to claim 1 wherein said length and width incremental linear scales are linear magnetic pulsing scales having successive, reversely-polarized, spaced-apart scale elements, with said length scale being mounted on said gage bed, and said width scale being mounted on said transverse leg of said stop means.

3. The linear measurement gage according to claim 2, wherein said length and width scanning units each comprise a pair of hall effect magnetic sensors, said pair of said length scanning unit being mounted on said pair of said width scanning unit being mounted on said extensible and retractable arm of said stop means transverse leg.

4. The linear measurement gage according to claim 1, wherein said display means comprises a digital LED display.

5. The linear measurement gage according to claim 1, wherein said stop means is slidably mounted on said gage bed fence and has a rotatable control knob which is engagable with said fence to fix the position of said stop means.

6. The linear measurement gage according to claim 5, wherein said gage bed fence has a C-shaped cross-section.

7. The linear measurement gage according to claim 1, wherein said retractable arm has an upstanding shaft mounted thereon which, in turn, telescopically supports an upstanding and vertical displaceable handle grip.

8. The linear measurement gage according to claim 7, wherein said handle grip has an inwardly-directed, horizontally-extending tongue secured thereto and a push button electrical switch mounted thereon which serves as said reference switch.

9. A linear measurement gage for measuring workpiece miter lengths and inside dimensions for picture and window frames and the like, comprising:

an elongated gage bed having an upright fence on which a workpiece may be removably mounted abutting said fence;

stop means slidably mounted on said gage bed having a stop which may butt against a workpiece mitered end and whose position may be fixed to fix the position of said workpiece, said stop means having a transverse leg coupled thereto disposed transversely to said gage bed which has an extensible and retractable arm slidably secured thereto;

length scale and scanning means having an incremental linear length scale and a length non-contacting scanning unit for scanning said incremental linear length scale, said scanning of said scale, and linear length scale being a linear magnetic pulsing scale having successive, reversely polarized, spaced-apart scale elements, with said linear scale being mounted on said gage bed, and said length scanning unit comprises a pair of hall effect magnetic sensors mounted on said stop means for travel therewith along said gage bed;

width scale and scanning means having an incremental linear width scale and a width non-contacting scanning unit for scanning said incremental linear width scale, and width scanning unit generating width output signals in response to the scanning of said width scale, said width scale and scanning means including a reference switch for generating a reference signal relative to the position or width being measured, said linear width scale being a linear magnetic pulsing scale having successive, reversely polarized, spaced-apart scale elements, with said width scanning unit comprises a pair of hall effect magnetic sensors mounted on said extensible and retractable arm of said stop means transverse leg;

computer control means for receiving the length and width output signals, and for converting said output signals to a linear measure output signal corresponding to the inside dimension of the workpiece being measured; and display means for displaying said measured inside dimension of the workpiece coupled to said computer control means.

10. The linear measurement gage according to claim 9, wherein said handle grip has an inwardly-directed, horizontally-extending tongue secured thereto and a push button electrical switch mounted thereon which serves as said reference switch.

* * * * *